United States Patent [19]

Spidell

[11] 4,381,622

[45] May 3, 1983

[54] LAWN EDGE CONSTRUCTION AND METHOD

[75] Inventor: Vernon B. Spidell, Oak Park, Mich.

[73] Assignee: Alan L. Kaufman, Southfield, Mich.

[21] Appl. No.: 220,786

[22] Filed: Dec. 29, 1980

[51] Int. Cl.³ .............................................. A01G 9/00
[52] U.S. Cl. ..................................... 47/33; 273/34 B; 411/455; 411/490; 411/510
[58] Field of Search ....................................... 47/32–33, 47/9; 119/118, 121–122; 52/155; 135/16 PE; 273/34 B, 176 J; 411/455, 490, 510

[56] References Cited

U.S. PATENT DOCUMENTS

| | | | |
|---|---|---|---|
| 2,172,553 | 9/1939 | Tripp | 411/455 |
| 2,967,448 | 1/1961 | Hallock | 411/490 |
| 3,427,030 | 2/1969 | Ward | 273/195 A |
| 3,459,107 | 8/1969 | Anderson et al. | 273/195 A |
| 3,494,244 | 2/1970 | Wayland | 411/510 |
| 3,885,795 | 5/1975 | Brewer | 273/34 B X |
| 3,895,797 | 7/1975 | Moore | 273/176 J X |

Primary Examiner—Robert E. Bagwill
Attorney, Agent, or Firm—Harness, Dickey & Pierce

[57] ABSTRACT

A lawn edge and/or trim construction comprising a carpet of synthetic turf secured to the ground employed around fences, flower beds, residential structures, and any other structure to edge such structure or to impede the growth of vegetation for a more aesthetically appealing lawn area. A preferred type of anchor for the lawn edge construction is also disclosed comprising a stake having a head portion overlapping the substrate base of the synthetic turf, an extended portion having multiple grooves along the axial extent thereof, a throughbore at an intermediate portion of the extended portion, and a notch disposed between said head portion and said extended portion to hold the stake to the base of the turf, the head portion having a cap of synthetic turf to disguise the stake when holding the turf in place, and a method for installing such construction.

19 Claims, 8 Drawing Figures

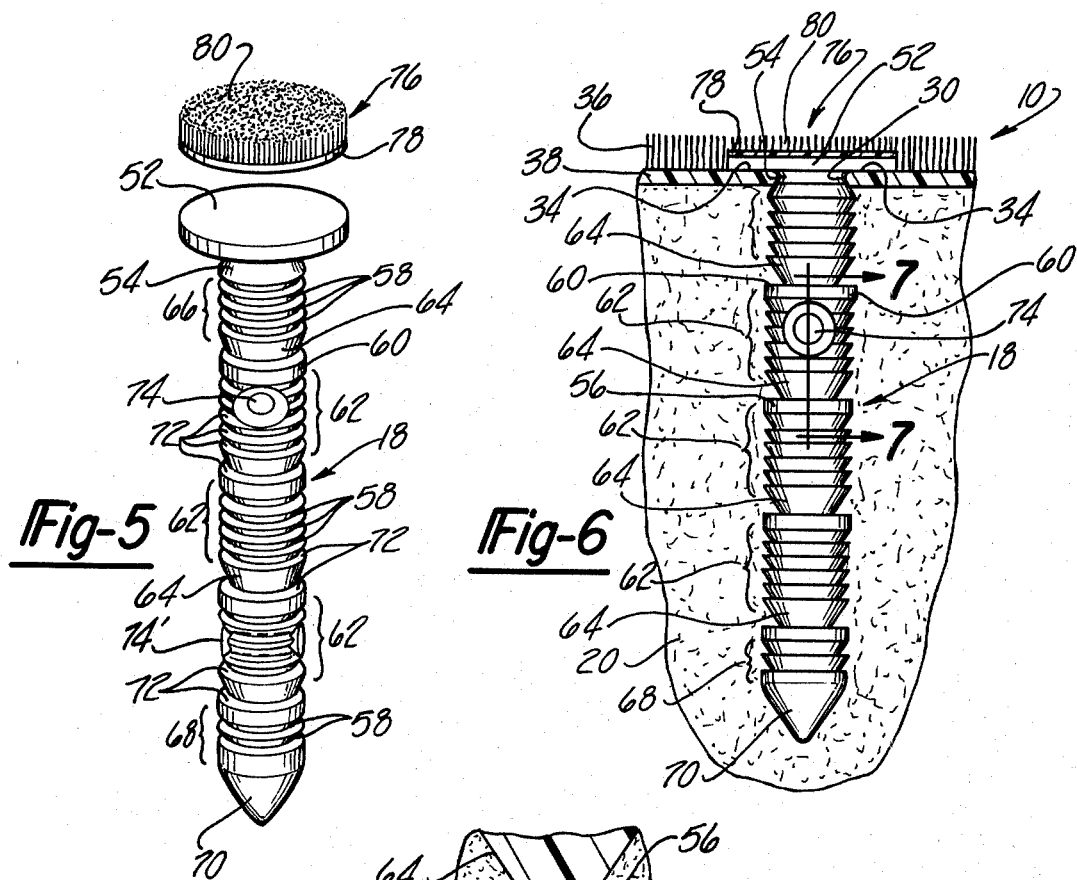
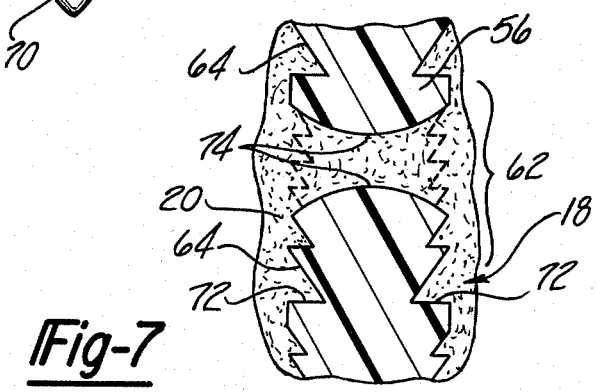
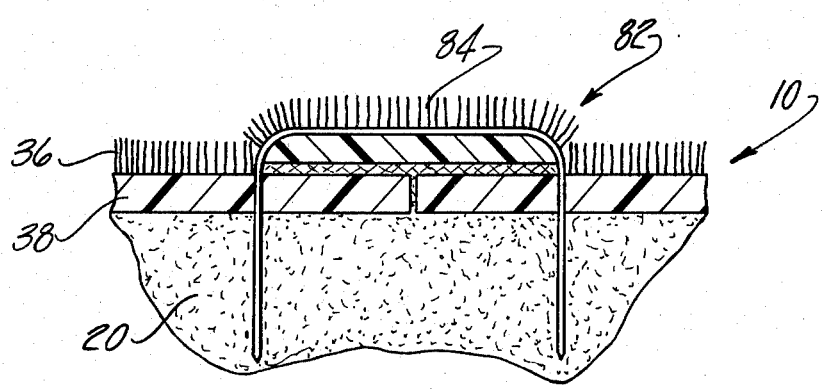

LAWN EDGE CONSTRUCTION AND METHOD

BACKGROUND AND SUMMARY OF THE INVENTION

The present invention relates generally to provide a lawn-like trim and particularly to an improved construction in which a carpet of artificial grass or synthetic turf is employed as a lawn edging material around fences, fire hydrants, flower beds, etc, and is fixedly secured to the earth by an improved anchoring means. Also included within the scope of the present invention is a preferred type of anchoring means to hold the synthetic turf in a desirable manner to the earth, comprising a stake having a head portion overlapping the substrate base of the synthetic turf, the head portion having a cap of synthetic turf of a relatively shorter length extending therefrom so as to match the height as the artificial grass of the carpet when set in place as a cap, and having improved means for anchoring the turf to the earth via the stake by providing the stake with an extended portion having multiple grooves along the axial extent of the outer surface and at least one throughbore at an intermediate point of the extended portion of the stake with means for holding the stake to the base or substrate of the turf disposed between the head portion and the extended portion of the stake.

Synthetic or artificial turf (see U.S. Pat. Nos. 3,332,828 and 3,682,476 for example) sold under trade names such as Astrotruf, Tartan Turf, or the like is well known in the art, and is used most notably for athletic fields to provide a stable surface for acceptable playing conditions in all types of weather. In this situation elaborate ground preparation must be done prior to installation of the turf. In the present invention, it is desirable to provide an artificial turf construction for decorative or trim purposes with a minimum of ground preparation.

Thus, it is a general object to provide an improved artificial turf construction which can be installed with a minimum of ground preparation for use for decorative or trim purposes.

It is another object of the present invention to provide an improved anchoring means for securement of synthetic turf to the earth.

It is a further object to provide the improved anchoring means in a manner to readily secure the synthetic turf to the earth but also be easily disguised to provide an overall aesthetically appealing effect.

It is also an object of the present invention to provide a system for lawn-like trim to place synthetic turf in areas where either lawns will not grow or where grass and other vegetation is not desirable, such as around fences and the like. A further object is to provide a more even, aesthetically appealing lawn/structure or lawn/flower bed interface and allow the entire lawn to be cut up to the lawn-like trim.

Other objects and advantages of the instant invention will be apparent in the following specification, claims and drawings.

BRIEF DESCRIPTION OF THE DRAWINGS

FIG. 5 illustrates a securing stake of the present invention;

FIG. 6 illustrates the device of FIG. 5 utilized with the synthetic turf and secured into the ground;

FIG. 7 is an enlarged view of the throughbore of the device used to secure the synthetic turf as illustrated in FIG. 6; and FIG. 8 illustrates means for interconnecting adjacent pieces of synthetic turf.

DESCRIPTION OF THE PREFERRED EMBODIMENT

Figure 1:
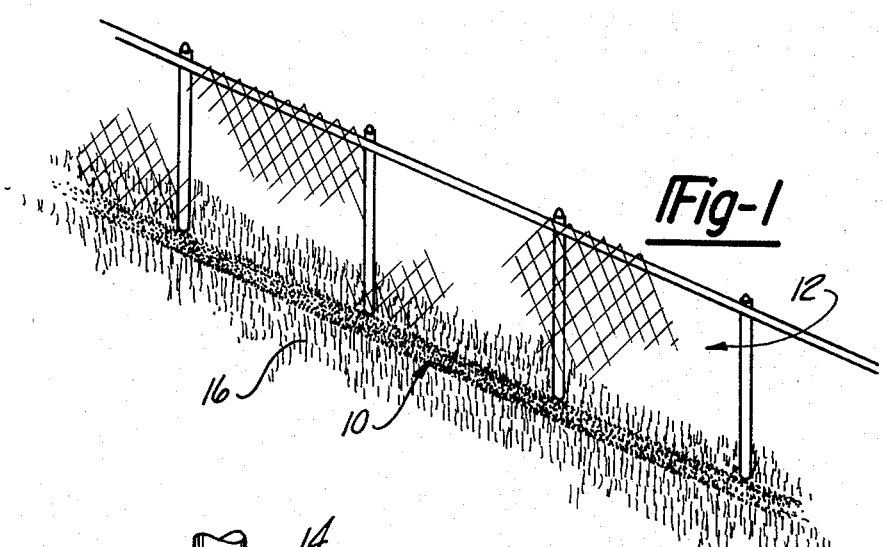
FIG. 1 is an elevated perspective view of the combination of the present invention utilized along the edge of a fence.
Figure 2:
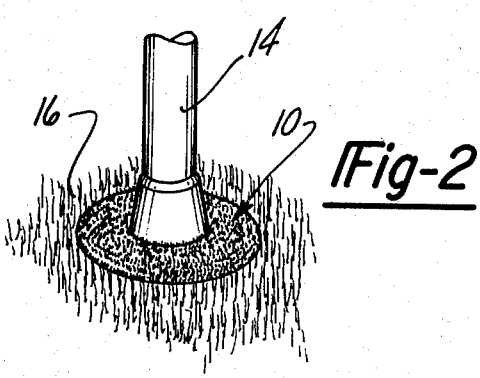
FIG. 2 is an elevated view of the combination of the present invention utilized around a pole such as a flag pole.

Referring now to FIGS. 1 and 2, an improved lawn edge construction is illustrated. Synthetic turf 10 is set along the border of a fence 12 in FIG. 1 and around a pole 14 in FIG. 2 as a means of edging the lawn 16 at that point to both keep grass and other vegetation away from the fence 12 and/or pole 14 in order to eliminate lawn trimming at an edge and also provide an even, aesthetically appealing lawn-like edge to adjacent the fence, a pole, a fire hydrant, a residential structure, a flower bed, or whatever structure is desired to be edged by a lawn-like appearance. Note that the turf 10 can be located such that the line of fence 12 could be located intermediate its width such that both sides of the fence would be edged.

Figure 3:
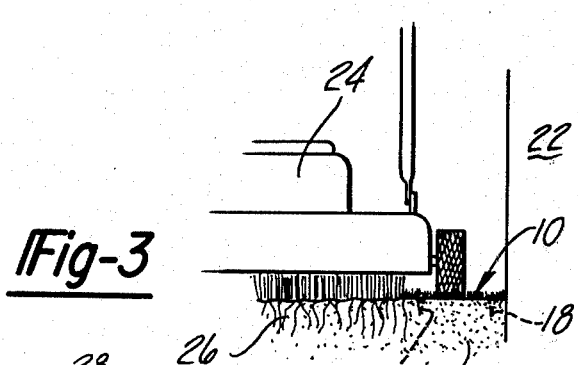
FIG. 3 illustrates the combination of the present invention as utilized along a structure, such as a residential house.

FIG. 3 illustrates synthetic turf used in the combination of the present invention with securement stakes 18 inserted into the earth 20. The synthetic turf 10 is situated adjacent a residential structure 22. Replacement of a strip of actual lawn with the synthetic turf 10 permits the lawn mower 24 to cut the lawn 26 to the very edge of the lawn 26 and provide an even appearance as the lawn 26 approaches the residential structure 22. Note that the strip of turf 10 is located at the appropriate level to support the wheels of the lawn mower 24 such that the mower 24 will be supported to be generally level when one set of wheels are on the turf 10 and the opposite set are on the lawn 26.

Figure 4:
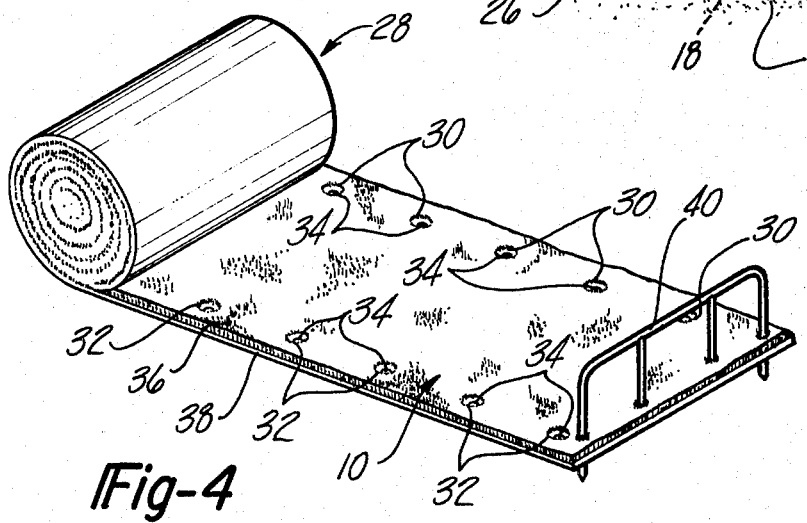
FIG. 4 illustrates a roll of synthetic turf modified to be utilizable in the combination of the present invention.

FIG. 4 illustrates a roll 28 of synthetic turf 10 modified to be implemented in the combination of the present invention. The roll 28 of the synthetic turf 10 has a multiplicity of punched holes 30, 32 set at spaced intervals therein. Immediately adjacent each hole 30, 32 is a cleared counterbored like area 34 from which the fabric of the synthetic grass 36 has been removed to expose the substrate base 38 of the turf 10. FIG. 4 also illustrates that multi-pronged hold down stakes 40 may be used to secure the turf 10 at the end or at any intermediate point therein, although such stakes are not preferred from the standpoint of aesthetic appearance, and may be removed once the turf 10 is secured in accordance with the present invention. The stakes 40 extend for substantially the width of the roll 28 to facilitate even tensioning when the roll 28 is pulled during installation. Thus in a straight line installation such as shown in FIGS. 1 and 3 a roll of turf 10 (such as shown in FIG. 4) can be placed upon the earth and extended along the structure (such as fence 12 or building 22) and secured at one end via pronged stakes 40. Next the roll 28 of turf 10 is unrolled and pulled taut and stakes 18 are installed in holes 32, 34 of the tensioned portion of the roll 28. For long runs, the above steps can be repeated. Of course, the supporting earth will be first made smooth, and packed and at the level desired for that particular installation.

Referring to FIGS. 5 and 6, a preferred embodiment of the improved anchor means of the present invention comprising a securement stake 18 is illustrated. As shown in FIG. 6, the securement stake 18 has a head portion 52 of a diameter proximate to that of the cleared area 34 such that upon installation it will overengage the substrate base 38 of the synthetic turf carpet at the cleared area 34. Just below the head portion 52 the securement stake 18 narrows to a diameter forming a notch 54 having a minimum diameter substantially the same as the diameter as one of the punched holes 30, 32 in the synthetic turf 10 and a pitch extending substantially the thickness of the substrate base 38 of the turf 10. The diameter of the securement stake 18 enlarges immediately adjacent the notch 54 along the axial extent thereof to provide the extended portion 56 of the stake 18. A multiplicity of spaced grooves 58 extend along the exterior surface 60 of the extended portion 56 of the stake 18.

The intermediate grooves 58 are disposed in sets 62 of five grooves having substantially the same pitch, with a more substantially spaced or larger pitched groove 64 separating each set 62. The upper set 66 only includes four grooves of similar pitch (and the notch 54). Likewise the lower set 68 only includes two grooves of similar pitch along with the point portion 70 of the stake 18. Each of the grooves 58 is designed to slope in the direction of the point portion 70 and have an annular face 72 in a plane substantially perpendicular to the axis of the stake 18 directed towards the head portion 52 of the stake 18. Different combinations of, types of, and spacing or pitch between the grooves 58 however, are still intended to be within the scope of the present invention. Note that the stake 18 is of a generally circular cross-section and is generally solid except for radial throughbores 74 and 74′.

Thus venturi-shaped throughbore 74 (FIG. 7) extends radially through the stake 18 at an intermediate position thereof while similarly shaped throughbore 74′ extends radially in quadrature therewith. The multiplicity of grooves 58 and the throughbores 74, 74′ combine to provide substantial securement of the stake 18 within the ground. The base of the synthetic turf 10 snaps into the notch portion 54 just below the head 52 of the stake 18 to retain the position of the head 52 with respect to the base 38 of the synthetic turf 10. The turf 10 and stake 18 are held firmly in position with respect to the ground. A cap 76 having a substrate base 78 and a synthetic grass portion 80 can be fixedly secured to the stake 50 by glue or the like. The grass-like portion 80 of the cap 76 is shorter in length in order to provide the uniform appearance of the secured synthetic turf and hide the head portion 52 of the stake 18 from view.

Note that in installation of synthetic turf 10 the cap 76 can be applied after the stake 18 has been set into the ground, which can be accomplished by a hammer or mallet, or it can be applied previously during fabrication of the stake 18.

In one form of the invention, the notch portion 54 is of a selected cross-section to fracture at a preselected desirable load such that in the event the synthetic grass or turf is to be removed the stake 18 need not be removed but the head portion 52 can be broken away (freeing the turf) by a suitable prying tool, i.e. claw hammer, crow bar, etc.

Note also that by removing the fabric or reducing the depth of the synthetic grass 36 at the cleared area 34 bounce back of stake 18 upon (hammering) installation will be minimized providing for a more secure installation. As previously noted the cleared area 34 also permits a more aesthetically appealing final installation since the head 52 of the stake 18 will be covered by the cap 76.

At the points where the synthetic turf must be abutted with another portion of synthetic turf, abutment stakes 82 may be utilized, having associated therewith a complementary portion of synthetic grass 84, as illustrated by FIG. 8.

Thus there is disclosed in the above description and in the drawings an illustrative embodiment of the invention which fully and effectively accomplishes the objects thereof. However, it will be apparent that variations in the details in the apparatus may be indulged in without departing from the sphere of the invention herein described, or the scope of the appended claims.

What is claimed is:

1. In combination with a lawn on an earth surface and an area adjacent said lawn forming an edge of said lawn, a lawn edge construction comprising:

an artificial turf structure constructed of synthetic turf and having a turf edge extending along said edge of said lawn, the synthetic turf of said turf structure comprising a grass-like portion and a base portion;

anchor means for anchoring said turf structure to the earth surface.

cover means constructed of synthetic turf having a grass-like portion and a base portion for hiding said anchor means from view; and securing means for securing said cover means to said anchor means, wherein said turf includes a plurality of recesses within which said anchor means is adapted to be disposed which recesses are covered from view by said anchor means and said cover means.

2. A combination in accordance with claim 1, wherein the synthetic turf of said cover means has a shorter length grass-like portion than the grass-like portion of the adjacent synthetic turf of said turf structure wherein the tops of the grass-like portions of said synthetic turf form a horizontal plane when said anchor means is installed and said cover means is set in place.

3. A combination in accordance with claim 1, within said anchor means comprising a stake having a head portion, an extended portion extending from said head portion and retaining grooves on the outer surface of said extended portion.

4. In combination with a lawn on an earth surface and an area adjacent said lawn forming an edge of said lawn, a lawn edge construction comprising:

an artificial turf structure constructed of synthetic turf and having a turf edge extending along said edge of said lawn, the synthetic turf of said turf structure comprising a grass-like portion and a base portion;

anchor means for anchoring said turf structure to the earth surface comprising a stake having a head portion, an extended portion extending from said head portion and retaining grooves on the outer surface of said extended portion;

cover means constructed of synthetic turf having a grass-like portion and a base portion for hiding said anchor means from view; and securing means for securing said cover means to said anchor means;

wherein said artificial turf structure extends along the edge of said lawn and includes a series of holes through the base portion of said turf and a cleared area surrounding each of said holes having substantially no grass secured to said base portion and wherein said head portion of said stake is located within said cleared area and overengages said base portion adjacent said holes of said artificial turf structure when said turf structure is anchored to the earth surface.

5. A combination in accordance with claim 4, wherein the synthetic turf of said cover means has a shorter length grass-like portion than the adjacent grass-like portion of the synthetic turf of said turf structure to provide a uniform height of the grass-like portions when said cover means is set in place onto said head portion of said stake.

6. An artificial turf structure constructed of synthetic turf comprised of a substrate base and a grass-like portion secured to said base, including at least one securement stake for securing said turf directly to the earth, said securement stake comprising:

a head portion;

an extended portion extending away from said head portion, having axially spaced annular grooves along the outer surface thereof; and holding means for holding said stake and said base of said turf structure together.

7. The invention of claim 6, wherein the synthetic turf of said turf structure includes a hole extending through said substrate base thereof and a cleared area surrounding said hole having substantially no grass-like portion secured to said base and said holding means comprises a notch disposed between said head portion and said extended portion engageable with said base at said hole.

8. The invention of claim 7, wherein said hole in said base of said turf structure has a diameter less than both the diameter of said head portion and the diameter of said extended portion adjacent said notch.

9. A claim in accordance with claim 8, wherein the pitch of said notch extends substantially the thickness of said substrate base to hold said base within said notch and hold said base and said stake together.

10. A claim in accordance with claim 6, further comprising a throughbore extending radially through said extended portion at an intermediate position thereto.

11. A claim in accordance with claim 10, wherein said throughbore is generally shaped in the form of a venturi.

12. For trimming a selected surface along a predetermined edge on an earth surface which is smooth and generally well packed the invention comprising an artificial turf structure constructed of synthetic turf having a turf edge extending along said predetermined edge, the synthetic turf of said turf structure comprising a grass-like portion and a base portion and adapted to be held in a roll, anchor means including a plurality of anchoring stakes for anchoring said turf structure to the earth surface;

said turf having holes through said base portion and a clean area substantially clear of said grass-like portion around the periphery of the holes, said anchoring stakes having a shank portion and an enlarged head portion with the shank portion being insertable through said holes and with said head portion being of a size to be received within said clear area to overengage said base portion when installed.

13. The combination of claim 12 with said anchoring stakes comprising:

a head portion; and an extended portion, extending from said head portion and having a point portion at the opposite extreme thereof from said head portion and having a plurality of circumferentially extending grooves axially spaced along the extent thereof with at least a selected one of said grooves having a larger pitch than others of said grooves, said selected one of said grooves positioned to engage the earth when applied to the synthetic turf.

14. The stake of claim 12 wherein each groove is formed by having a sloped face in the direction of the point portion of said extended portion meeting an annular face disposed in a plane substantially perpendicular to the axis of said extended portion and directed toward said head portion of said stake.

15. The combination of claim 12 with said anchoring stakes including means on said stakes for locking said stakes to said base portion of said turf when said stakes are moved into said holes.

16. A securement stake for securing synthetic turf to earth comprising:

a head portion; and an extended portion, extending from said head portion and having a point portion at the opposite extreme thereof from said head portion, having a plurality of annular grooves axially spaced along the extent thereof with selected ones of said grooves having a larger pitch than others of said grooves, and having a throughbore extending radially through said extended portion at a position intermediately disposed between said point portion and said head portion of said stake.

17. A lawn edge construction for trimming a selected surface along a predetermined edge on an earth surface including an artificial turf structure constructed of synthetic turf having a turf edge extending along said predetermined edge, the synthetic turf of said turf structure comprising a grass-like portion and a base portion; anchor means for anchoring said turf structure to the earth surface; and cover means constructed of synthetic turf having a grass-like portion and a base portion for hiding said anchor means from view, and securing means for securing said synthetic turf to said anchor means; wherein said turf includes a plurality of recesses within which said anchor means is adapted to be disposed which recesses are obscured from view by said anchor means and said cover means.

18. In combination with a lawn on an earth surface and an area adjacent said law forming an edge of said lawn, a lawn edge construction comprising:

an artificial turf structure constructed on synthetic turf and having a turf edge extending along said edge of said lawn, the synthetic turf of said turf structure comprising a grass-like portion and a base portion;

anchor means for anchoring said turf structure to the earth surface comprising a stake having a head portion, an extended portion extending from said head portion and retaining grooves on the outer surface of said extended portion;

cover means constructed of synthetic turf having a grass-like portion and a base portion for hiding said anchor means from view; and securing means for securing said cover means to said anchor means;

wherein said stake has a reduced sectioned notch portion adjacent said head portion whereby said head portion can be removed by application of a preselected load at said head portion.

19. A securement stake for securing synthetic turf to earth comprising
   a head portion;
   a reduced section notch portion adjacent said head portion whereby said head portion can be removed by application of a preselected load at said head; and
   an extended portion, extending from said head portion and having a point portion at the opposite extreme thereof from said head portion and having a plurality of annular grooves axially spaced along the extent thereof with selected ones of said grooves having a larger pitch than others of said grooves.

* * * * *

UNITED STATES PATENT AND TRADEMARK OFFICE
CERTIFICATE OF CORRECTION

PATENT NO. : 4,381,622

DATED : May 3, 1983

INVENTOR(S) : Vernon B. Spidell

Page 1 of 3

It is certified that error appears in the above-identified patent and that said Letters Patent is hereby corrected as shown below:

On the title page

The following prior art of record was omitted and should be included in the citation of references, insert:

References Cited
U.S. PATENT DOCUMENTS

| | | | |
|---|---|---|---|
| 277,658 | 5/1883 | Arthur | |
| 427,815 | 5/1890 | Wolf | |
| 729,591 | 6/1903 | Jacob | |
| 844,294 | 2/1907 | Winslow | |
| 1,139,515 | 5/1915 | Haas | |
| 1,277,936 | 9/1918 | Innes | |
| 1,345,650 | 7/1920 | Wessels | |
| 1,352,733 | 9/1914 | Egerton | |
| 1,541,160 | 6/1925 | MacDonald | |
| 1,679,374 | 8/1928 | Reirden | |
| 1,916,494 | 7/1933 | Schrickel | |
| 1,917,014 | 7/1933 | Bowes | |
| 1,949,063 | 2/1934 | Merrill | 94/7 |
| 1,970,959 | 8/1934 | Gauntlett | 273/33 |
| 2,344,131 | 3/1944 | Coryell | 94/4 |
| 2,360,674 | 10/1944 | Harter | 94/13 |
| 2,515,847 | 7/1950 | Winkler | 154/49 |
| 2,888,779 | 6/1959 | Hostetter | 47/33 |
| 2,924,948 | 2/1960 | Mueller | 61/57 |
| 3,016,578 | 1/1962 | Rohe | 18/59 |
| 3,108,443 | 10/1963 | Schuermann et al. | 64/45 |
| 3,139,163 | 6/1964 | Haller | 189/90 |
| 3,282,015 | 11/1966 | Rohe et al. | 52/704 |
| 3,323,802 | 6/1967 | Riner | 273/176 |
| 3,348,847 | 10/1967 | Fischl | 273/186 |
| 3,390,044 | 6/1968 | Malakoff | 161/19 |

UNITED STATES PATENT AND TRADEMARK OFFICE
CERTIFICATE OF CORRECTION

PATENT NO. : 4,381,622

DATED : May 3, 1983

INVENTOR(S) : Vernon B. Spidell

It is certified that error appears in the above-identified patent and that said Letters Patent is hereby corrected as shown below:

| | | | |
|---|---|---|---|
| 3,395,625 | 8/1968 | Blanchette et al. | 94/7 |
| 3,407,714 | 10/1968 | Henderson | 94/7 |
| 3,418,897 | 12/1968 | Humalainen | 94/7 |
| 3,422,732 | 1/1969 | York | 94/3 |
| 3,433,137 | 3/1969 | Henderson | 94/7 |
| 3,446,122 | 5/1969 | Raichle et al. | 94/7 |
| 3,497,211 | 2/1970 | Nagin | 272/56.5 |
| 3,515,373 | 6/1970 | Abbe | 256/32 |
| 3,520,082 | 7/1970 | Smith | 47/33 |
| 3,574,107 | 4/1971 | Hurka | 161/67 |
| 3,661,687 | 5/1972 | Spinney, Jr. et al. | 161/21 |
| 3,682,476 | 8/1972 | Kempson et al. | 273/25 |
| 3,713,624 | 1/1973 | Niemann | 256/32 |
| 3,727,347 | 4/1973 | Barnes | 47/32 |
| 3,740,303 | 6/1973 | Alderson et al. | 161/67 |
| 3,801,414 | 4/1974 | Chin | 161/21 |
| 3,801,421 | 4/1974 | Allen et al. | 161/67 |
| 3,803,760 | 4/1974 | Matvey | 47/33 |

UNITED STATES PATENT AND TRADEMARK OFFICE
CERTIFICATE OF CORRECTION

PATENT NO. : 4,381,622

DATED : May 3, 1983

INVENTOR(S) : Vernon B. Spidell

It is certified that error appears in the above-identified patent and that said Letters Patent is hereby corrected as shown below:

```
3,806,096   4/1974    Eccleston et al..........................256/32
3,900,656   8/1975    Schmidt..................................428/215
3,916,563   11/1975   Tedesh...................................47/33
4,007,307   2/1977    Friedrich................................428/17
4,067,757   1/1978    Layman...................................156/71
4,280,698   7/1981    Troiano..................................273/34B
```

Column 6, line 54, "law" should be --lawn--

Column 8, line 1, after "head" insert --portion--.

Signed and Sealed this

Second Day of August 1983

[SEAL]

Attest:

Attesting Officer

GERALD J. MOSSINGHOFF

Commissioner of Patents and Trademarks